Dec. 3, 1968 R. L. ATKIN ET AL 3,414,336
SKID CONTROL SYSTEM
Filed May 9, 1967 2 Sheets-Sheet 2

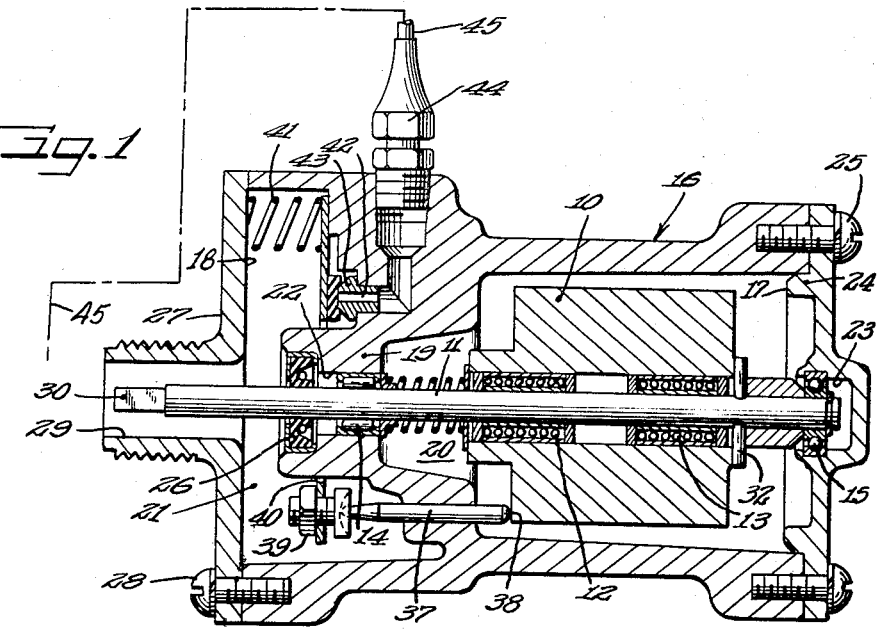

INVENTORS
Rupert Lloyd Atkin
Gilbert H. Drutchas
BY Hill, Sherman, Meroni, Gross & Simpson ATTORNEYS United States Patent Office 3,414,336
Patented Dec. 3, 1968

3,414,336
SKID CONTROL SYSTEM
Rupert Lloyd Atkin, Grosse Pointe Woods, and Gilbert H. Drutchas, Birmingham, Mich., assignors to TRW, Inc., Cleveland, Ohio, a corporation of Ohio
Filed May 9, 1967, Ser. No. 637,216
16 Claims. (Cl. 303—21)

ABSTRACT OF THE DISCLOSURE

A skid control system including means for detecting an impending wheel lock condition and for responding with a control signal to manipulate a valve means within the hydraulic brake lines connecting a master cylinder and wheel brake motor means to release the pressure applied to the motor means. The valve means used to control the flow of pressure to the wheel brakes and to release that pressure upon an impending wheel skid condition has a by-pass line and an associated second valve means within the by-pass line to by-pass the anti-skid device when an excessive hydraulic pressure is applied to the braking system.

BACKGROUND OF THE INVENTION

Field of the invention

The field of art to which this invention pertains is a control device for regulating the braking pressure on vehicle wheels in response to an excessive deceleration of the wheels relative to the forward deceleration of the vehicle itself. More particularly, this invention relates to a means for by-passing an automatic valve mechanism associated with an anti-skid control device when excessive hydraulic pressure is applied to the brake lines.

SUMMARY

An important feature of the present invention is the provision of an anti-skid control device having means responsive to an impending wheel lock condition to interrupt and release the flow of hydraulic pressure to the wheel brakes of a vehicle and wherein means are provided to by-pass the anti-skid device by the application of an above normal pressure to the braking system.

Another feature of the present invention is the provision of a by-pass valve for an anti-skid control device wherein the by-pass valve includes a piston means operable in response to hydraulic pressure within the brake lines to by-pass the anti-skid control system.

It is an object of the present invention to provide an anti-skid control device which includes a valve means to interrupt the flow of hydraulic pressure to the wheel brakes and a by-pass means to by-pass the operation of the valve means in accordance with the application of a controlled braking pressure to the hydraulic system.

It is another object of this invention to provide a hydraulic shut-off valve for an anti-skid control device wherein fluid pressure in the hydraulic brake line serve to close the shut-off valve and wherein a by-pass valve is provided to by-pass the shut-off valve by the application of excessive fluid pressure to the hydraulic brake system.

It is still another object of this invention to provide a by-pass valve for a hydraulic anti-skid brake control device as described above wherein the by-pass valve includes a piston slidably mounted within a by-pass line and having a face exposed to the hydraulic line pressure and actuated by that pressure to open the by-pass lines and to connect the master cylinder directly with the wheel brakes.

It is a further object of this invention to provide a by-pass valve for an anti-skid control device as described above wherein the by-pass valve comprises a piston slidably mounted within a by-pass line and exposed to hydraulic fluid pressure in the brake lines for being actuated thereby wherein the opening of the by-pass valve is preceded by the closing of the normal flow outlet extending from the anti-skid control valve means to the wheel brake motor means.

It is also an object of this invention to provide an anti-skid control device having a valve means for interrupting the flow of pressure to the wheel brake motor means and having an accumulator chamber and means for expanding the volume of the accumulator chamber to release hydraulic fluid pressure trapped in the wheel brake lines and wherein a by-pass valve means is provided to by-pass the anti-skid control valve means and the accumulator chamber to connect the master cylinder of the system directly to the wheel brakes and wherein the by-pass valve means includes a valve piston for closing the connection of the accumulator chamber from the wheel brake means and sequentially opening the by-pass line directly to the master cylinder in response to an excessive fluid pressure applied in the brake lines.

It is also an object of this invention to provide an anti-skid control device having a valve means for interrupting the flow of pressure to the wheel brake motor means, wherein an actuator is provided to open the valve means against hydraulic pressure in the hydraulic lines for all pressures below a predetermined level, and wherein a by-pass valve is provided to by-pass the anti-skid control valve means to connect the master cylinder of the system directly to the wheel brakes, and wherein the by-pass valve means is maintained in a closed position until the hydraulic line pressure approximates or exceeds the predetermined pressure such that at the point where the actuator ceases to be operative, the by-pass valve means assures a continuous flow of pressure from the master cylinder to the wheel brake motor means.

These and other objects, features and advantages of the present invention will be understood from the following description and the associated drawings wherein reference numerals are utilized to illustrate a preferred embodiment.

BRIEF DESCRIPTION OF THE DRAWINGS

FIGURE 1 is a sectional view through a deceleration sensing device for comparing the angular deceleration of the wheels of a vehicle with the longitudinal deceleration of the vehicle itself and to generate a control signal in response to an excessive deceleration of the vehicle wheels;

FIGURE 2 is a sectional view through a vacuum or other fluid actuator and associated valve means for interrupting and releasing hydraulic fluid pressure in the brake lines of a braking system according to the present invention and illustrating the inoperative position of a by-pass valve means to by-pass the anti-skid system in accordance with the application of a selected brake pressure to the brake lines connecting the master cylinder to the wheel brake means;

DESCRIPTION OF THE PREFERRED EMBODIMENTS

Figures 3, 4:
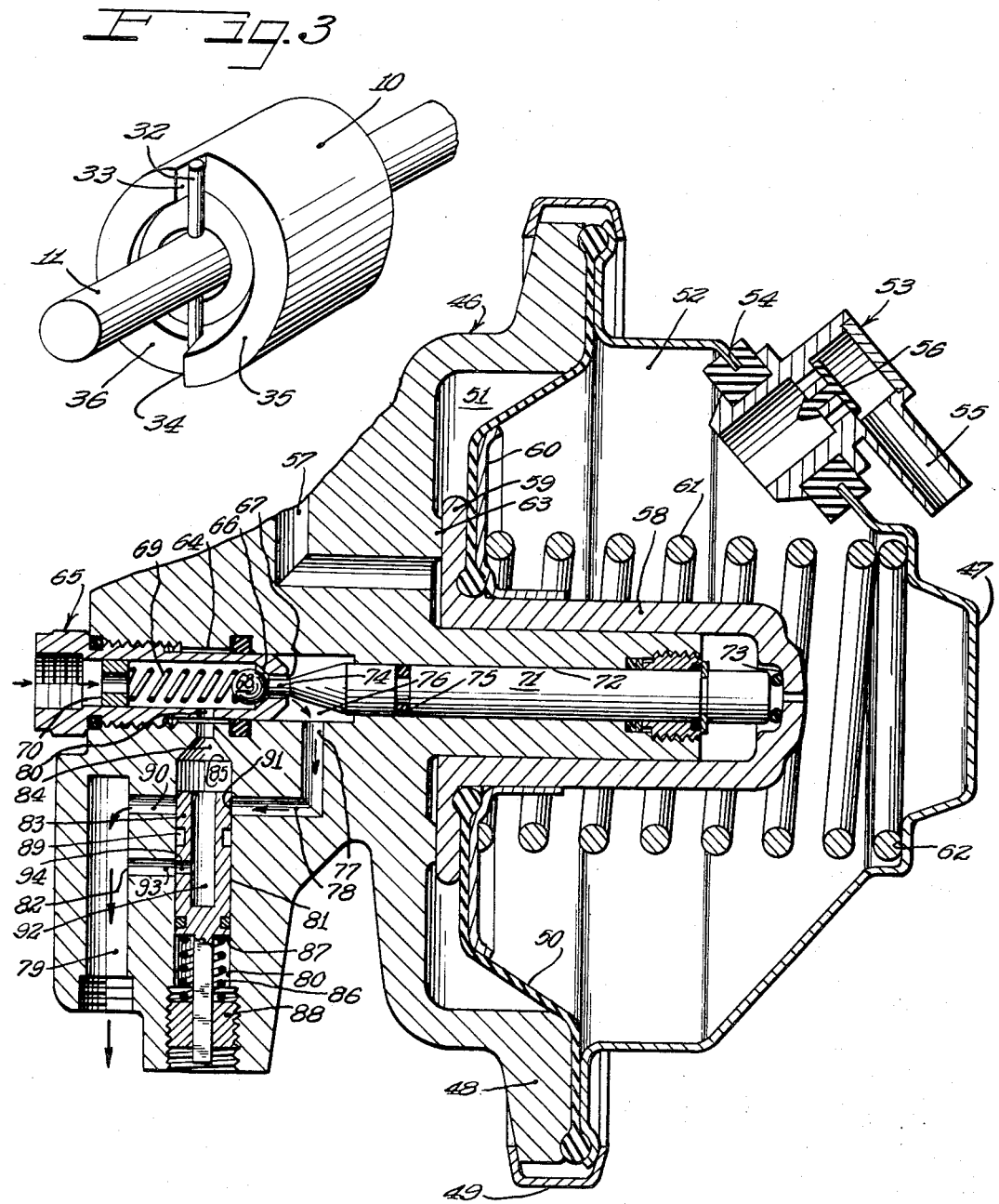
FIGURE 3 is an elevational view of an inertial mass utilized in the sensing device of FIGURE 1 to compare the deceleration of the wheels of a vehicle with the deceleration of the vehicle itself.
FIGURE 4 is a sectional view through an actuator system similar to the view of FIGURE 2 and illustrating the operative positioning of the by-pass valve means of this invention.

The basic element of the sensing device shown in FIGURE 1 is a cylindrical inertial mass 10 which is free to both rotate and slide axially on a shaft 11. Bushings 12 and 13 are provided between the mass 10 and the shaft 11 to minimize friction during both motions. The shaft 11 is carried in the bearings 14 and 15 within a housing 16.

The housing 16 comprises essentially a cylindrical casting having an opened end 17, a further opened end 18 and a partition 19 which divides the interior of the housing into a deceleration comparison chamber 20 and a control chamber 21. The bearing 14 is disposed within a bore 22 formed within the partition 19, and the bearing 15 is carried within a bore 23 formed within an end cover 24 which is secured to the opened end 17 of the housing 16 by a number of fasteners 25.

The shaft 11 extends through the bore 22 and through the opened end of the housing 18. A seal 26 is provided about the shaft 11 within the bore 22 to prevent dust and other particles from entering the deceleration comparison chamber 20. A further end plate 27 is disposed about the opened end 18 of the housing 16 and is secured to the housing by a number of fasteners 28. The shaft 11 extends within a nipple 29 of the end plate or cover 27, and means are provided as at 30 to connect the shaft 11 to a flexible cable or the like to drive the shaft 11 at a fixed multiple of the rear wheel rotational speed.

The sensor unit of FIGURE 1 is mounted so that its shaft is parallel to the longitudinal axis of the vehicle with the shaft connection toward the rear. Accordingly, the forward motion of the vehicle is as indicated by the arrow 31 in FIGURE 1. The lineal deceleration of the vehicle urges the mass toward the front where it is restrained by a drive pin 32. The drive pin 32 is fixed to the shaft 11 as shown in FIGURES 1 and 3. The drive pin 32 normally is in contact with abutments 33 and 34 of face cams 35 and 36. This contact of the drive pin 32 at the abutments 33 and 34 causes the mass 10 to rotate in unison with the shaft 11. Since the rotational speed of the shaft 11 is proportional to the rotational speed of the rear wheels of the vehicle, the angular deceleration of the mass is proportional to the rear wheel deceleration during normal braking.

The design of the inertial mass 10, its weight, diameter and the lead angle of the face cams 35 and 36 is such that the axial force component of the cam acting on the pin due to rotational inertia during deceleration is equal in magnitude, but opposite in direction to the axial force due to lineal deceleration during optimum vehicle braking. Hence, as long as the angular deceleration remains proportional to the linear deceleration of the slowing vehicle with both decelerations reaching zero simultaneously, no wheel lock or vehicle skid will ensue. In this case, the mass 10 and drive shaft 11 are slowed together with no relative motion occurring between the two, and accordingly the anti-skid system will not be actuated.

When the rear brake pressure is excessive for the existing vehicle tire-to-road adhesion factor, the angular velocity and deceleration of the rear wheels will reach zero before any or all of the vehicle deceleration has been absorbed, and these locked wheels will cause a vehicle skid. In this case, the mass 10 tends to remain in rotation as the shaft 11 is being brought to a halt by its connecting drive to the rear wheels. The rotational inertia of the mass 10 is then translated into a rearward force by the lead angle of the face cams 35 and 36 acting on the drive pin 32. Since the full force of a lagging linear deceleration of the mass 10 cannot balance its translated rearward force, the mass 10 moves toward the rear. The rearward motion of the mass 10, in turn, moves a probe 37 which contacts the mass at a point 38. The probe 37 and its associated nut 39 move rearward to cause a spring member 40 to be deflected to the rear about its anchor spring 41. Accordingly, a passage 42 in a valve seat 43 is opened to the atmosphere which enters the control chamber 21 via the nipple 29. Atmosphere then enters the coupling 44 and the atmosphere line 45.

The atmosphere signal which is generated by the sensor of FIGURE 1 in response to an impending wheel lock condition is ultimately applied to a vacuum actuator as shown in FIGURE 2.

The actuator unit of FIGURE 2 comprises a housing 46 which includes a cover plate 47. The cover plate 47 is clamped against a flange 48 of the housing 46 as at 49 to securely position a diaphragm 50 therebetween. The diaphragm 50 divides the interior of the housing 46 into first and second chambers 51 and 52 respectively. In the embodiment shown in FIGURE 2, a fitting 53 is securely mounted within the cover plate 47 at an opening 54, and the fitting 53 has a nipple 55 which may be connected to a vacuum source such as is available at the intake manifold of the vehicle engine. A vacuum check valve 56 is deployed within the fitting 53 in a well understood manner to prohibit the flow of air into the chamber 52.

The housing 46 has a passageway 57 which is coupled from the lines 45 connected to the chamber 51. Accordingly, the passageway 57 is a means for permitting the entry of atmosphere into the chamber 51, and the fitting 53 is a means for maintaining the chamber 52 in a substantially evacuated state. Therefore, means are provided for establishing a pressure differential across the diaphragm 50 to move that diaphragm from the retracted position shown in FIGURE 2 to an extended position at the right hand portion of the housing cover 47.

The diaphragm 50 has a bleed port 50a and has a cap member 58 secured at the center portion thereof by means of a flange 59 and a spring seat 60, the diaphragm 50 being compressed between the flange 59 and the spring seat 60. A coil spring 61 is disposed between the spring seat 60 and an annular wall 62 formed at the right hand portion of the cover 47. In this way the diaphragm 50 is biased by the spring 61 into the retracted position shown in FIGURE 2 with the flange 59 of the cap member 58 seated at a seat 63 formed within the chamber 51.

The actuator housing 46 has a cavity 64 formed centrally thereof, and a fitting 65 is threadably and sealably secured within the cavity 64 as shown. The fitting 65 is connected directly to a brake line leading to the master cylinder of the brake system. The fitting 65 has a valve seat 66 formed at the right hand end thereof, and the valve seat 66 has an opening 67 formed centrally therethrough. A ball 68 is biased into a seated position with the seat 66 by means of a spring 69 which is disposed between the ball 68 and a spring seat 70 which is rigidly mounted within the fitting 65.

A piston 71 is slidably mounted within a bore 72 formed within the housing 46. The piston 71 contacts the end portion 73 of the cap member 58 associated with the diaphragm 50 and contacts the ball 68 at the end 74 thereof. The piston 71 is sealably mounted within the bore 72 by an O-ring 75.

An accumulator chamber 76 is formed at the right hand side of the fitting 65 and has an outlet 77 leading to a circuit passageway 78. The circuit passageway 78 ultimately is connected directly to the wheel brake motor means through a passageway 79.

The cavity 64 also has an outlet passageway 80 which is ultimately connected to the wheel brake motor means through the same passageway 79.

A by-pass chamber 81 forms part of a by-pass line which extends from the cavity outlet 80 to a junction 82 of the by-pass line with the passageway 79. A piston 83 is slidably mounted within the by-pass chamber 81. The piston 83 is biased into a closed position at 85 by a spring means 86 which is deployed between the piston 83 at a seat 87 and a seat 88 which is threadedly fitted within the by-pass chamber 81 as shown.

An annular passageway 89 is formed around the piston 83 to communicate the circuit passageway 78 with a further circuit passageway 90 which in turn is connected to the main passageway 79. Accordingly, fluid is allowed to flow from the accumulator chamber 76 through a passageway 78, the passageway 89, the passageway 90 to the passageway 79 when the piston 83 is maintained in the position shown in FIGURE 2.

However, when the piston 83 is moved to the position shown in FIGURE 4, the annular passageway 89 is no longer aligned with the passageways 78 and 90 and communication between those passageways is blocked by the piston wall 91. When the piston 83 has moved to the position shown in FIGURE 4, a central passageway 92, which is formed within the piston 83, communicates with a passageway 93 formed within the housing 46. This allows fluid to flow directly from the cavity 64 through the passageway 80 and through the center of the piston 83 via the passageway 92 and through a right angle passageway 94 to the passageway 93 and hence to the passageway 79.

When rear wheel lock occurs, the sensor unit of FIGURE 1 will detect the excessive deceleration of the rear wheels and generate a signal for applying atmosphere to the chamber 51 of the actuator of FIGURE 2 to move the diaphragm 50 from the retracted position shown in FIGURE 2 to the right hand portion of the assembly. This movement is accomplished since more air enters the chamber 51 through the passage 57 than escapes through the bleed port 50a. Once the air supply through passage 57 is cut off, escaping air through the bleed port 50a allows the diaphragm 50 to move to the retracted position shown. The movement of the diaphragm 50 to the right allows the hydraulic pressure applied within the fitting 65 to freely move the piston 71 toward the right therefore allowing the ball 68 to be seated against the seat 66. This action then disconnects the master cylinder from the rear wheel brakes by closing off the communication of the accumulator chamber 76 with the master cylinder. Any hydraulic pressure trapped in the rear wheel brakes will cause the piston 71 to move to the right thereby expanding the accumulator chamber 76 and releasing the pressure on the rear wheel brakes.

However, in the embodiment shown in FIGURE 2, the by-pass means is provided to by-pass the operation of the valve means 66–68. This by-pass means consists of an outlet 80 which is connected from the cavity 64 to a passageway 93 and hence to the main passageway 79 which is connected directly to the rear wheel brake means.

If the ball 68 is seated at the seat 66 thereby closing off the normal fluid access to the rear wheel brakes, excessive pressure applied to the brake pedal and hence to the master cylinder will increase the pressure within the cavity 64 and cause the piston 83 to move within the by-pass chamber 81 thereby causing misalignment of the annular passageway 89 with the circuit passageways 78 and 90. This action cuts off the communication of the accumulator chamber with the rear wheel brake means. Further motion of the piston 83, due to the application of high pressure within the cavity 64, causes alignment of a right angle passageway 94 with the by-pass passageway 93 such that the cavity 64 is connected directly through the central passageway 92 of the piston 83 to the passageway 79 which is connected direcly to the rear wheel brakes. Accordingly, through this invention, any malfunctioning of the anti-skid device which would maintain the valve means 66–68 in a closed position, would not entirely disable the braking system on the rear axle of the vehicle, as the application of an excessive braking force to the brake pedal would open the by-pass valve 83 to re-establish the connection between the master cylinder and the rear wheel brakes. It is noted that the same hydraulic pressure which causes the closing of the valve means 66–68 is the cause of the opening of the valve means 83.

Also, through the use of the by-pass system as shown in this invention, the operator may employ the full force of the braking system immediately after the temporary operation of the skid control system during the passing of the vehicle over an icy strip on the road surface or the like.

Most importantly, the use of the by-pass valve allows a reduction in the biasing force provided by the coil spring 61 and hence allows a reduction in the size of the diaphragm 50 which is required to overcome the biasing force of the spring 61.

It is apparent that the coil spring 61 must exert sufficient force on the piston 71 to open the valve 66–68 against the hydraulic pressure applied through the master cylinder to the brake lines. For example, it may be required that the spring 61 be sufficient to overcome 1800 p.s.i. in the brake lines to open the valve 66–68 to assure sufficient braking force under all possible operating conditions. However, it has been recognized that pressures of 1200 p.s.i. are adequate for locking the wheels under all normal braking conditions. Conditions requiring above 1200 p.s.i. to lock the wheels are extremely rare and are usually encountered only during severe brake performance testing where a rapid series of full brake stops are performed from speeds of 80 to 100 miles per hour.

Accordingly, by designing the actuator and the coil spring 61 to open the valve 66–68 only for pressures at or below 1200 p.s.i. and by allowing the anti-skid device to be by-passed through the by-pass valve for pressures above 1200 p.s.i., braking power is assured under all conditions without requiring the anti-skid actuator to be excessive in size and inordinately expensive.

It will be understood that the system as described applies to a rear wheel skid control arrangement, but that the front wheel brakes could be similarly controlled by supplementing the system where a greater degree of brake control is desired.

We claim:
1. In a vehicle having hydraulic wheel brake means, including a master cylinder and a master cylinder operator, wheel brake motor means and a hydraulic circuit communicating the master cylinder with the motor means, a skid control system comprising:
  first valve means operably disposed within said hydraulic circuit for interrupting and releasing the hydraulic pressure applied to the motor means by way of said master cylinder,
  a hydraulic by-pass line communicating with the said hydraulic circuit at an inlet point intermediate said master cylinder and said first valve means and at an outlet point intermediate said first valve means and said motor means so as to by-pass said first valve means and connect said master cylinder directly to said motor means,
  a second valve means operably disposed within said by-pass line for controlling the flow of fluid therethrough,
  means biasing said second valve means into a closed position within said by-pass line, and
  means for opening said second valve means against said biasing means in response to above normal pressure being applied to said master cylinder operator.

2. A skid control system in accordance with claim 1 wherein said second valve means has a valve head slidably disposed in said by-pass line and facing said inlet point thereof, said valve head receiving the hydraulic circuit fluid pressure thereagainst and being movable by said fluid pressure against said biasing means, to open said second valve means.

3. A skid control system in accordance with claim 2 wherein said biasing means exerts a force on said second valve means in excess of the opposing force generated by said hydraulic fluid pressure at said valve head during a normal braking action and said force developed by the biasing means being less than the maximum opposing force available at said valve head by the hydraulic pressure under emergency braking conditions.

4. A skid control system in accordance with claim 2 wherein a third valve means is operably disposed within said hydraulic circuit for controlling the flow of fluid therethrough, said third valve means being disposed in said hydraulic circuit at a point intermediate the inlet and outlet points of communication of the by-pass line with the hydraulic circuit, whereby the closing of said third valve means increases the fluid pressure available at said valve head of said second valve means to overcome the force of said associated biasing means.

5. A skid control system in accordance with claim 4 wherein said third valve means is actuated by the movement of the valve head of the second valve means and wherein movement of said valve head in response to hydraulic pressure applied thereagainst closes said third valve means prior to the opening of said second valve means.

6. A brake system for a vehicle including a master cylinder and a master cylinder operator, wheel brake motor means and a hydraulic circuit communicating the master cylinder with the motor means, a skid control and override device comprising:

a housing having a cavity formed therein,
said cavity being connected in series with said hydraulic circuit and having a first valve means therein for controlling the flow of fluid therethrough,
an accumulator chamber formed within said hydraulic circuit between said first valve means and said brake motor means,
sensor means for detecting an impending wheel skid and for generating a control signal indicative thereof,
actuator means responsive to said control signal for closing said first valve means to interrupt the flow of fluid to the motor means and subsequently to expand the volume of said accumulator chamber to release hydraulic pressure trapped at the motor means,
said hydraulic circuit having a by-pass outlet formed therein at a point located between the first valve means and the master cylinder,
a by-pass line communicating from said hydraulic circuit outlet back to said hydraulic circuit at a point located intermediate said first valve means and said brake motor means,
a second valve means operably disposed within said by-pass line for controlling the flow of fluid therethrough,
means biasing said second valve means into a closed position within said by-pass line, and
means for opening said second valve means against said biasing means in response to above normal pressure being applied to said master cylinder operator.

7. A skid control and override device in accordance with claim 6 wherein
a by-pass chamber is formed within said by-pass line and wherein said second valve means includes a valve seat formed within said by-pass chamber and a piston slidably mounted within said chamber and engageable with said seat to control the flow of fluid therethrough,
means biasing said piston into a closed position against said seat,
said piston having a face thereof exposed to the hydraulic pressure within said circuit at said circuit outlet,
said piston being opened against the opposing force of said biasing means by the hydraulic force developed at said face, and
the face of said biasing means exceeding the hydraulic force developed at said face during a normal braking action and being less than said hydraulic force during an override braking action,
whereby said first valve means and accumulation chamber are by-passed during an override braking action.

8. A skid control and override device in accordance with claim 7 wherein
the portion of the hydraulic circuit extending from the accumulator chamber to the brake motor means intersects said by-pass chamber and forms a circuit inlet and outlet thereby,
said piston being normally closed against said valve seat,
said by-pass chamber having an outlet communicating with the by-pass line and being normally closed by said piston,
said piston having a first passageway formed therein and communicating from the hydraulic outlet to a point normally misaligned with the by-pass chamber outlet,
said piston having a second passageway formed therein and being normally aligned with said circuit inlet and outlet to allow the free flow of fluid from said accumulator chamber to said brake motor means,
the movement of said piston causing said second passageway to be misaligned with said circuit inlet and outlet and causing said first passageway to be aligned with the by-pass chamber outlet,
whereby communication between said accumulator chamber and said brake motor means is interrupted and communication between said cavity and said brake motor means is initiated.

9. A skid control and override device in accordance with claim 8 wherein the misalignment of said second passageway with said circuit inlet and outlet is accomplished prior to the alignment of said first passageway with the by-pass chamber outlet.

10. In a vehicle having hydraulic wheel brakes, a master cylinder and a hydraulic circuit communicating the master cylinder with the wheel brakes, the combination comprising:

valve means for interrupting and sequentially releasing the hydraulic pressure applied to the wheel brakes,
means for actuating said valve means in response to an impending wheel skid condition,
means for by-passing said valve means by the application of above normal brake pressure to said master cylinder,
said valve means including an accumulator chamber for expanding hydraulic pressure trapped in said wheel brakes, and
said by-pass means including means for shutting-off the access of the accumulator chamber to the wheel brakes.

11. The combination in accordance with claim 10 wherein said by-pass means includes a piston slidably disposed in a by-pass line and operated by the application of an excess hydraulic pressure to a face thereof, and wherein the movement of the piston both closes the accumulator chamber from the wheel brakes and opens the master cylinder circuit ahead of the valve means directly to the wheel brakes.

12. The combination in accordance with claim 11 wherein said piston is caused to travel in the by-pass line a first distance to close the accumulator chamber to the wheel brakes and a second further distance to open the hydraulic circuit ahead of the valve means to the wheel brakes.

13. In a vehicle having hydraulic wheel brake means, including a master cylinder and a master cylinder operator, wheel brake motor means and a hydraulic circuit communicating the master cylinder with the motor means, a skid control system comprising:

first valve means operably disposed within said hydraulic circuit circuit for interrupting and releasing the hydraulic pressure applied to the motor means by way of said master cylinder,
actuator means for opening said first valve means against hydraulic pressure within said hydraulic circuit,
a hydraulic by-pass communicating with the said hydraulic circuit at an inlet point intermediate said master cylinder and said first valve means and at an outlet point intermediate said first valve means and said motor means so as to by-pass said first valve means and connect said master cylinder directly to said motor means, a second valve means operably disposed within said by-pass line for controlling the flow of fluid therethrough, biasing means urging said second valve means into a closed position against the hydraulic pressure in said hydraulic circuit within said by-pass line, said actuator means being capable of opening said first valve means against the hydraulic pressure in said hydraulic circuit until said hydraulic pressure exceeds a predetermined value, said biasing means holding said second valve in a closed position until hydraulic pressure in said hydraulic circuit approximates or exceeds said predetermined value.

14. A skid control system in accordance with claim 13 wherein said second valve means has a valve head slidably disposed in said by-pass line and facing said inlet point thereof, said valve head receiving the hydraulic circuit fluid pressure thereagainst and being movable by said fluid pressure against said biasing means, to open said second valve means.

15. A skid control system in accordance with claim 14 wherein said biasing means exerts a force on said second valve means in excess of the opposing force generated by said hydraulic fluid pressure at said valve head during a normal braking action and said force developed by the biasing means being less than the maximum opposing force available at said valve head by the hydraulic pressure under emergency braking conditions.

16. A skid control system in accordance with claim 15 wherein said actuator is capable of opening said first valve means for hydraulic line pressure generally less than 1200 p.s.i. and wherein said second valve means is opened against said biasing means by hydraulic line pressure generally in excess of 1200 p.s.i.

References Cited
UNITED STATES PATENTS

| | | | |
|---|---|---|---|
| 3,260,556 | 7/1966 | Packer | 303—21 |
| 3,338,637 | 8/1967 | Harned et al. | 303—21 |

MILTON BUCHLER, *Primary Examiner.*

J. J. McLAUGHLIN, *Assistant Examiner.*